(12) United States Patent
Hertrich

(10) Patent No.: US 7,475,413 B2
(45) Date of Patent: Jan. 6, 2009

(54) DATA STORAGE CARTRIDGE HAVING A REDUCED THICKNESS SEGMENT

(75) Inventor: Gregory P. Hertrich, Longmont, CO (US)

(73) Assignee: InPhase Technologies, Inc., Longmont, CO (US)

(*) Notice: Subject to any disclaimer, the term of this patent is extended or adjusted under 35 U.S.C. 154(b) by 778 days.

(21) Appl. No.: 10/807,608

(22) Filed: Mar. 23, 2004

(65) Prior Publication Data

US 2005/0028185 A1    Feb. 3, 2005

Related U.S. Application Data

(60) Provisional application No. 60/491,875, filed on Jul. 31, 2003.

(51) Int. Cl.
*G11B 23/03* (2006.01)

(52) U.S. Cl. ........................ 720/725; 360/133

(58) Field of Classification Search ............ 720/725; 360/133

See application file for complete search history.

(56) References Cited

U.S. PATENT DOCUMENTS

| | | | |
|---|---|---|---|
| 4,340,955 A | 7/1982 | Elliott | |
| 4,541,086 A | 9/1985 | Tanaka | |
| 5,406,547 A | 4/1995 | Akiyama et al. | |
| 5,530,691 A | 6/1996 | Fujisawa | |
| 5,719,691 A | 2/1998 | Curtis et al. | |
| 5,822,296 A | 10/1998 | Nakamichi | |
| 5,894,464 A | 4/1999 | Kim et al. | |
| 6,034,840 A | 3/2000 | Yamamoto et al. | |
| 6,118,619 A | 9/2000 | Kabasawa et al. | |
| 6,154,431 A | 11/2000 | Arai et al. | |
| 6,157,517 A | 12/2000 | Kishida | |
| 6,175,471 B1 | 1/2001 | Meguro | |
| 6,191,875 B1 | 2/2001 | Curtis et al. | |
| 6,205,105 B1 | 3/2001 | Okamoto et al. | |
| 6,236,540 B1* | 5/2001 | Meguro | 360/133 |
| 6,307,711 B1 | 10/2001 | Higuchi et al. | |
| 6,512,728 B1 | 1/2003 | Nasu et al. | |
| 6,515,830 B1* | 2/2003 | Meguro | 360/133 |
| 6,665,261 B2* | 12/2003 | Okamoto et al. | 720/738 |
| 6,779,194 B2* | 8/2004 | Okamoto et al. | 720/725 |

(Continued)

FOREIGN PATENT DOCUMENTS

JP        08212749    *  8/1996

(Continued)

OTHER PUBLICATIONS

ECMA Brochure (2001). "Data Interchange on 130 mm Magneto-Optical Disk Cartridges—Capacity: 9,1 Gbytes per Cartridge," *Standard ECMA-322*, pp. 1-151.

*Primary Examiner*—Angel A. Castro
(74) *Attorney, Agent, or Firm*—Morrison & Foerster LLP

(57) ABSTRACT

A data storage cartridge is described. The cartridge may include a housing having a top, a bottom, a front side, a back side, a first lateral side, and a second lateral side, said housing having a first media access aperture on the top of the housing; and a data storage medium contained within the housing, the data storage medium including a disk with a top and a bottom; wherein the front side of the housing contains a first segment of reduced thickness adjacent to the first media access aperture.

9 Claims, 17 Drawing Sheets

U.S. PATENT DOCUMENTS

| | | |
|---|---|---|
| 7,013,476 B2 * | 3/2006 | Volk et al. ............... 720/726 |
| 7,020,885 B2 | 3/2006 | Hertrich |
| 2002/0196730 A1 | 12/2002 | Kang et al. |
| 2003/0025955 A1 | 2/2003 | Curtis |
| 2004/0042383 A1 | 3/2004 | Takishima |
| 2004/0194151 A1 | 9/2004 | Earhart |
| 2005/0028180 A1 | 2/2005 | Hertrich |
| 2005/0028186 A1 | 2/2005 | Hertrich |

FOREIGN PATENT DOCUMENTS

| | | | |
|---|---|---|---|
| JP | 2001076456 | * | 3/2001 |
| JP | 2001-155461 A | | 6/2001 |

* cited by examiner

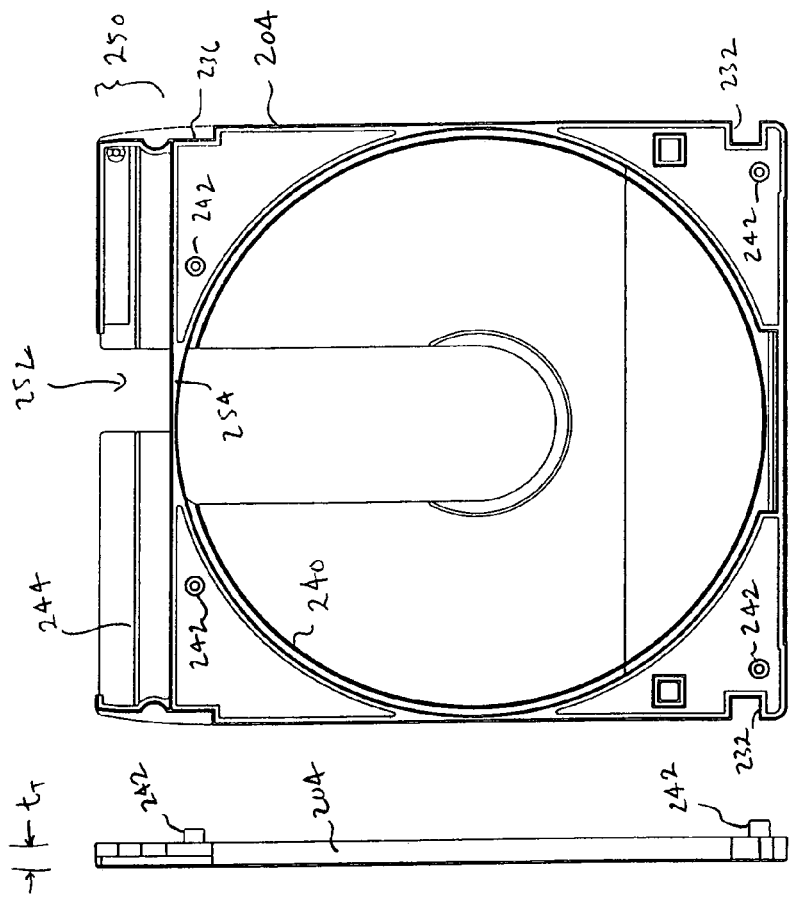
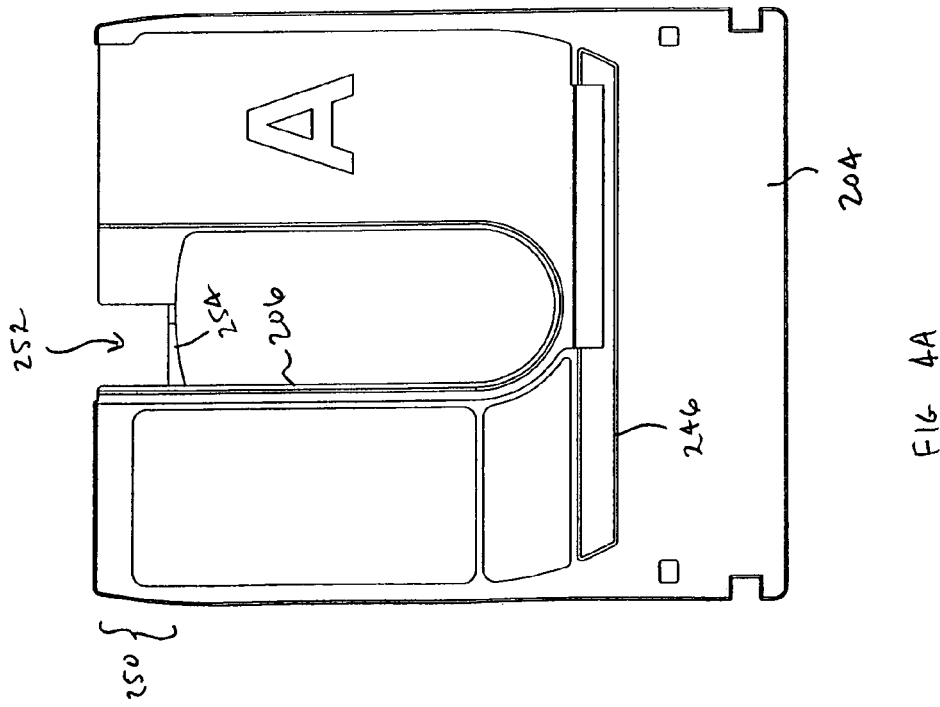

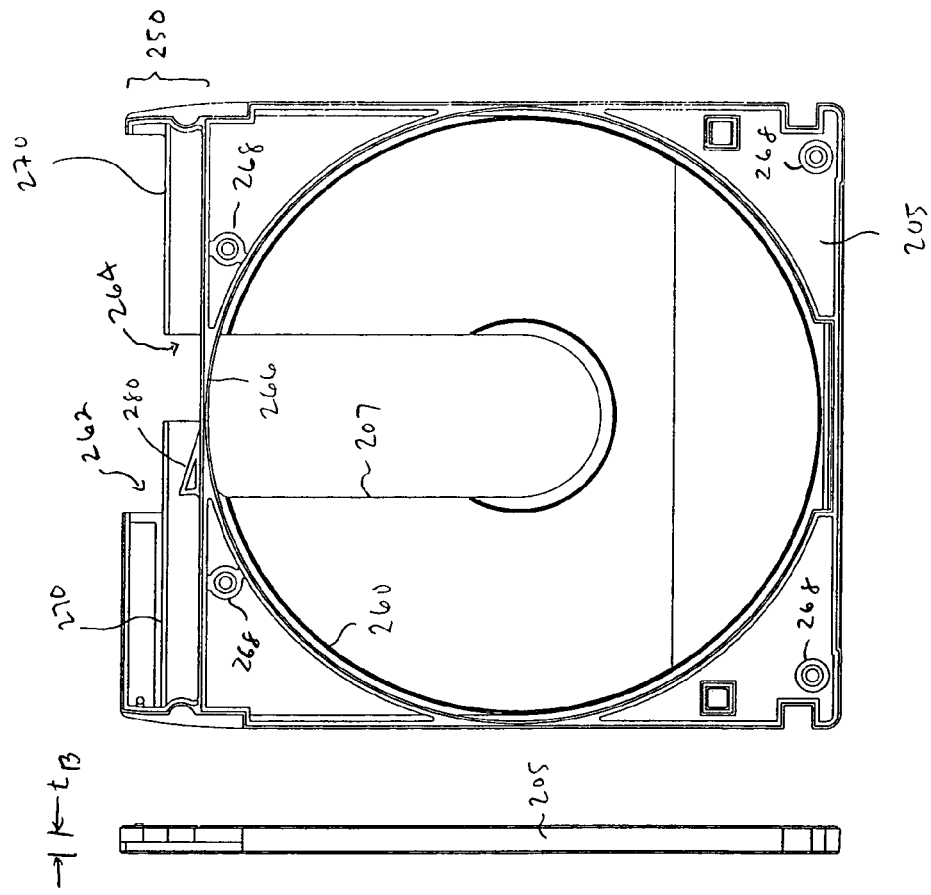
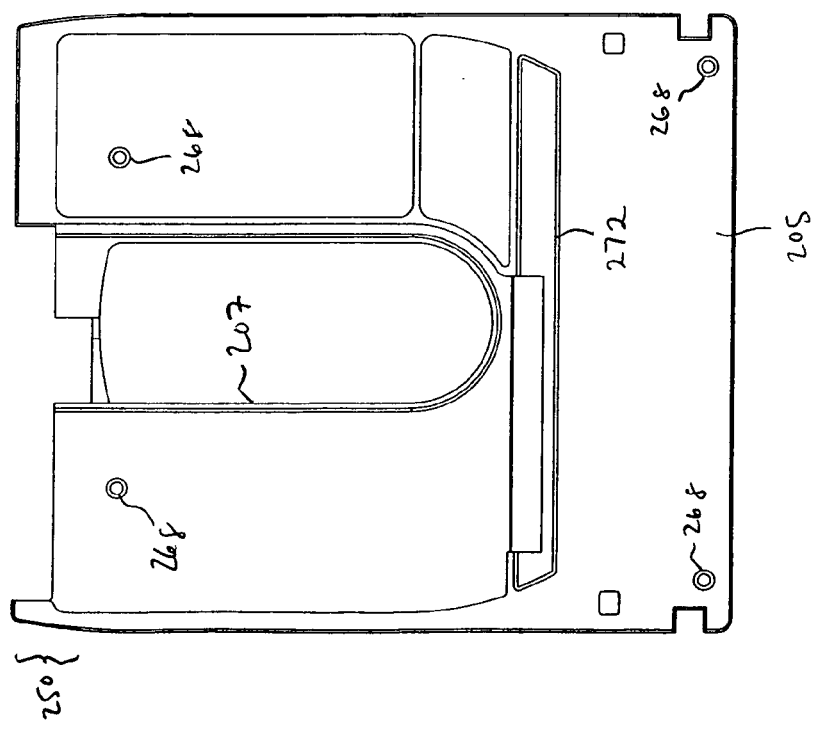

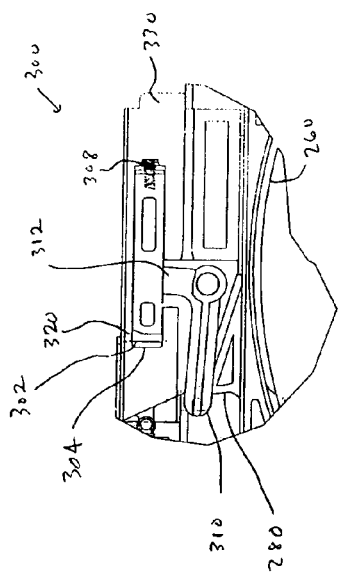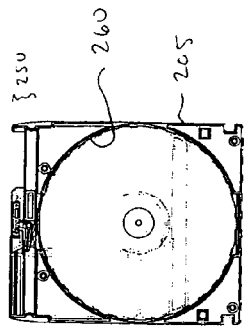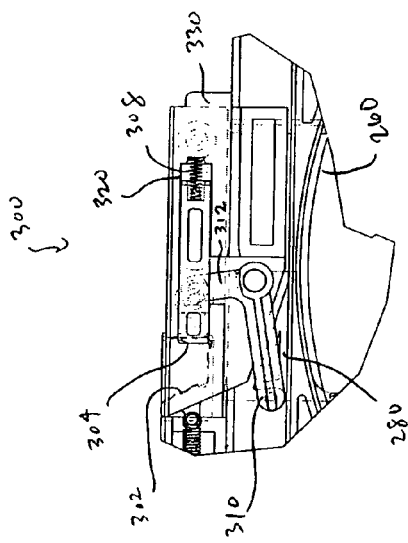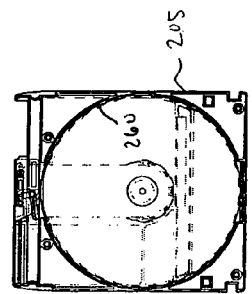

US 7,475,413 B2

DATA STORAGE CARTRIDGE HAVING A REDUCED THICKNESS SEGMENT

CROSS-REFERENCE TO RELATED APPLICATIONS

This application claims the benefit of U.S. Provisional Application No. 60/491,875, filed Jul. 31, 2003, the disclosure of which is incorporated herein in its entirety as if fully set forth below.

BACKGROUND OF THE INVENTION

Data storage cartridges have been used to house removable data storage media. FIGS. 1A-1B show one type of data storage cartridge 100 comprising a housing 102 containing a magneto-optical (MO) disk medium 104. The configuration and design of this MO cartridge 100 conforms to standards set by the ECMA Technical Committee TC31, which provides a uniform standard that can be followed by MO cartridge and MO drive manufacturers. This standard was published by ECMA as "Standard ECMA-322, Data Interchange on 130 mm Magneto-Optical Disk Cartridges—Capacity: 9,1 Gbytes per Cartridge" (June 2001), which is incorporated by reference herein in its entirety as if fully set forth below.

The housing 102 serves as a protective enclosure for the disk medium 104 and includes access windows 106 covered by a sliding shutter 108. A detent 110 is provided in the shutter 108 to enable a loading mechanism in a data drive to engage and slide the shutter 108. When the MO cartridge 100 is inserted into an MO drive in the loading direction L, a shutter opening mechanism in the MO drive engages the detent 110 to open the shutter 108 and uncover the windows 106, thereby exposing a portion of the MO disk 104. The MO disk 104 may consist of two sides assembled together with their recording layers on the inside. Data can be written onto both sides of the disk 104 as marks in the form of magnetic domains in the recording layer and can be erased from the disk 104 with a focused optical beam, using a thermo-magnetic effect. The data can be read with a focused optical beam, using the magneto-optical effect.

Another type of data storage system is known as holographic storage, described in detail in U.S. Pat. No. 5,719,691, entitled, "Phase Correlation Multiplex Holography," to Curtis et al., issued Feb. 17, 1998, and U.S. Pat. No. 6,191,875, entitled, "Process for Holography Using Reference Beam Having Correlated Phase Content," to Curtis et al., issued Feb. 20, 2001, incorporated by reference herein in their entireties. Holographic data storage systems store information or data based on the concept of a signal beam interfering with a reference beam at a holographic storage medium. The interference of the signal beam and the reference beam creates a holographic representation, i.e., a hologram, of data elements as a pattern of varying refractive index and/or absorption imprinted in a volume of a storage or recording medium such as a photopolymer or photorefractive crystal.

In holographic data storage (HDS), light from a coherent laser source is split into two beams, signal (data-carrying) and reference beams. Digital data to be stored are "encoded" onto the signal beam via a spatial light modulator (SLM). The data are arranged into data pages or large arrays, and these data pages are translated into pixels of the spatial light modulator that either block or transmit light. The light of the signal beam traverses through the modulator and is therefore encoded with the "checkerboard" pattern of the data page. This encoded beam then interferes with the reference beam through the volume of a photosensitive recording medium, storing the digital data pages. The interference pattern induces modulations in the refractive index of the recording material yielding diffractive volume gratings. The reference beam is used during readout to diffract off of the recorded gratings, reconstructing the stored array of bits. The reconstructed array is projected onto a pixelated detector, such as a CMOS photodetector array or the like. The detector reads the data in parallel, and the data can then be decoded into the original encoded data.

It may be desirable that the holographic data storage medium be provided in disk form and housed in a cartridge housing similar to the housings 102 for MO cartridges 100. This enables HDS manufacturers to utilize existing MO cartridge designs and handling mechanisms for easy conversion to HDS applications. However, the HDS medium functions differently from the MO storage medium, and therefore has different handling considerations. In particular, the HDS medium is sensitive to light and can be damaged if exposed to the read/write mechanism of an MO drive, or even ambient light. If an HDS medium is provided in a cartridge similar to the cartridge design of another media type, it would be desirable to implement protection mechanisms to prevent or inhibit attempts to load and read data from the HDS media using another type of non-HDS media drive. In addition, the data transfer mechanism used with certain storage media types, such as, for example, HDS media, may be structurally different from the data transfer mechanisms of other media types and may therefore have different design considerations.

Accordingly, there is a need for an improved design for a removable data storage cartridge housing a data storage medium.

BRIEF SUMMARY OF THE INVENTION

In accordance with embodiments of the present invention, a data storage cartridge is provided. The cartridge comprises: a housing having a top, a bottom, a front side, a back side, a first lateral side, and a second lateral side, said housing having a first media access aperture on the top of the housing; and a data storage medium contained within the housing, the data storage medium comprising a disk with a top and a bottom; wherein the front side of the housing contains a first segment of reduced thickness adjacent to the first media access aperture.

In accordance with other embodiments of the present invention, a data storage cartridge is provided. The cartridge comprises: a housing comprising a top shell and a bottom shell, said housing having a housing thickness; and a data storage medium contained within the housing between the top shell and the bottom shell; wherein said housing has an access side comprising a region of reduced thickness less than the housing thickness.

In accordance with other embodiments of the present invention, a data storage cartridge is provided. The cartridge comprises: a housing comprising a top side, a bottom side, and an access side, the top side of the housing defining a top plane; and a data storage medium contained within the housing; wherein said housing includes an unobstructed access path to the data storage medium from the access side said unobstructed access path passing through the top plane.

In accordance with other embodiments of the present invention, a data drive assembly is provided. The assembly comprises: a data drive, comprising a carriage assembly and a data transfer mechanism. The carriage assembly is configured to receive a data storage cartridge comprising: a housing defining a top plane, a bottom plane, a media access aperture, and a front side containing a segment of reduced thickness;

and a data storage medium contained in the housing; wherein the data drive is configured to receive the data storage cartridge such that as the data storage cartridge is loaded into the data drive, a portion of the data transfer mechanism passes adjacent the segment of reduced thickness and is received in the media access aperture such that the portion penetrates the top plane of the housing.

In accordance with other embodiments of the present invention, a data drive assembly is provided. The assembly comprises: a data drive comprising a data transfer mechanism, said data transfer mechanism having a first component and a second component separated by a first distance; wherein the data drive is configured to receive a data storage cartridge between the first component and the second component, wherein a maximum thickness of the data storage cartridge is greater than the first distance.

In accordance with other embodiments of the present invention, a method of operating a data drive assembly is provided. The method comprises: receiving a data storage cartridge in a data drive, the data storage cartridge comprising: a housing defining a top plane, a bottom plane, a media access aperture, and a front side containing a segment of reduced thickness; and passing a first portion of a data transfer mechanism of the data drive adjacent the segment of reduced thickness of the data storage cartridge such that the first portion penetrates the top plane of the housing as the data storage cartridge travels to a fully loaded position in the data drive.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

BRIEF DESCRIPTION OF THE DRAWINGS

FIGS. 4A-4C show top, side, and bottom views of a top shell of a cartridge housing, in accordance with embodiments of the present invention.

FIGS. 5A-5C show top, side, and bottom views of a bottom shell of a cartridge housing, in accordance with embodiments of the present invention.

FIGS. 9A-9B are top views of a bottom shell with a lock assembly in the locked position, in accordance with embodiments of the present invention.

FIGS. 10A-10B are top views of a bottom shell with a lock assembly in the unlocked position, in accordance with embodiments of the present invention.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

Figure 2B:
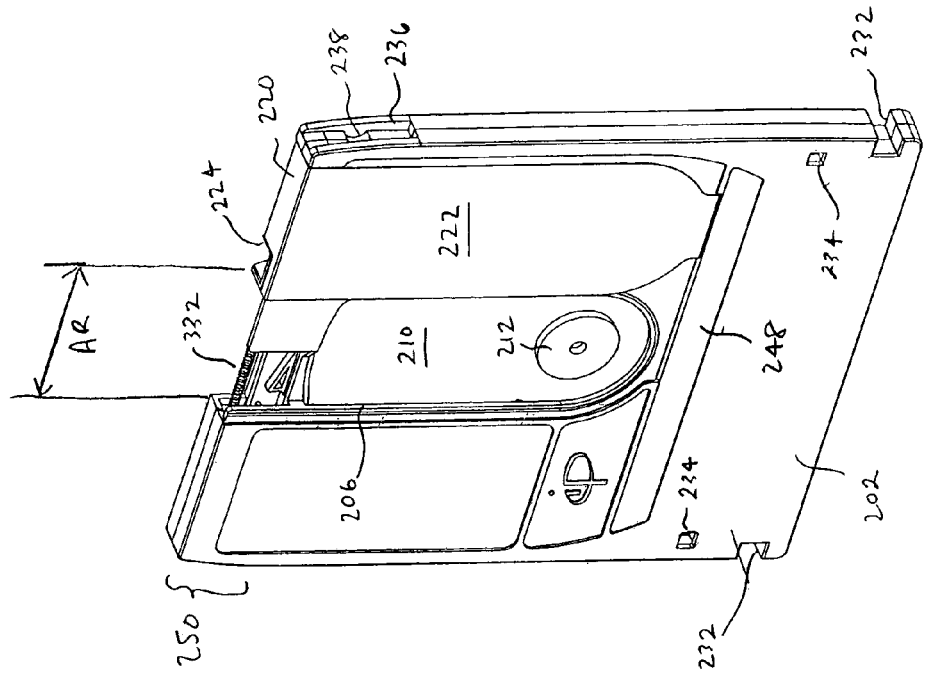
FIGS. 2A-2B show top perspective views of a data storage cartridge, in accordance with embodiments of the present invention.
Figure 2A:
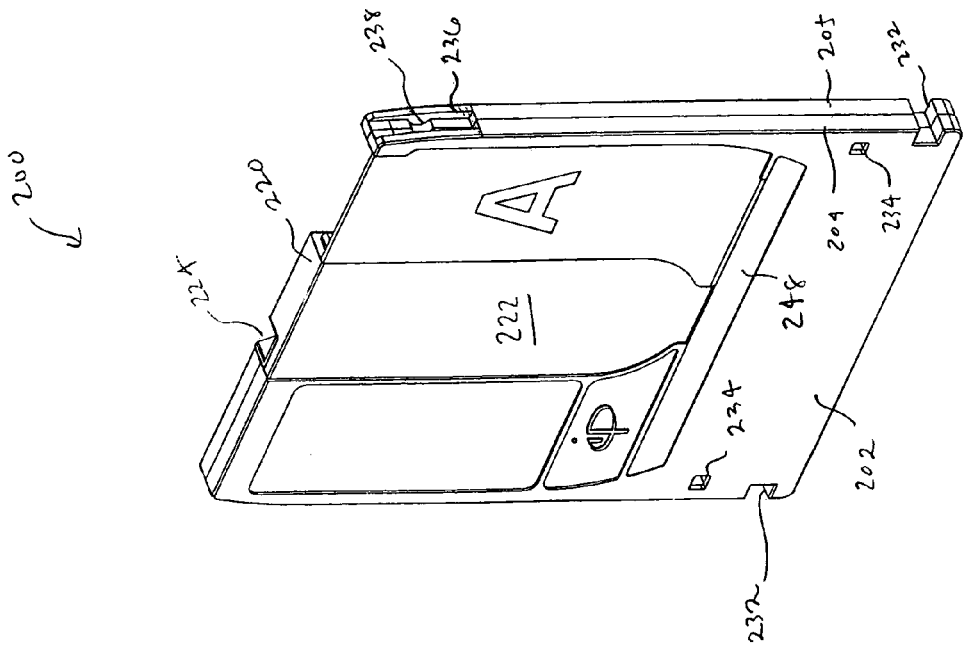

FIGS. 2A-2B are perspective views of a top side of a data storage cartridge 200, in accordance with embodiments of the present invention. The cartridge 200 is also described in present invention. The cartridge 200 is also described in "DATA STORAGE CARTRIDGE," by Gregory P. Hertrich, Ser. No. 60/491,875, filed Jul. 31, 2003, and "CARTRIDGE SHUTTER MECHANISM," by Gregory P. Hertrich, Ser. No. 60/492,093, also filed on Jul. 31, 2003, the disclosures of which are incorporated herein in their entirety as if fully set forth below. The cartridge 200 may comprise a cartridge housing 202 having a data storage medium 210 provided therein. The housing 202 is formed by a top shell 204 and a bottom shell 205. The top and bottom shells 204-205 include media access apertures 206 and 207 (shown in FIGS. 3A-3B), which expose a portion of the storage medium 210 contained therein. The top and bottom shells 204-205 may be formed of, for example, injection molded plastic. Other polymer-based materials or non-polymer-based materials may be used to form the shells 204-205. The storage medium 210 may be disk-shaped, having a top surface, a bottom surface, and a thickness, with a hub 212 provided at the center of the medium 210.

The cartridge 200 may further comprise a slidable shutter 220 having a first aperture cover portion 222 on the top side of the cartridge 200 for covering the top media access aperture 206 and a second aperture cover portion 223 on the bottom side of the cartridge 200 for covering the bottom media access aperture 207. FIG. 2A shows the top of the cartridge 200 with the shutter 220 in the closed position, and FIG. 2B shows the top of the cartridge 200 with the shutter 220 in the open position. The shutter 220 may further comprise a shutter detent/slot 224, which can be used to unlock and open the shutter 220, as will be described in greater detail below. In the illustrated embodiment, the first aperture cover portion 222 and the second aperture cover portion 223 are formed from a single piece of U-shaped material, such as plastic or sheet metal. In other embodiments, the cover portions 222-223 may be formed of separate components.

The cartridge housing 202 may also include various features that can be used to assist in the handling and storage of the cartridge 200 during use. A gripper slot 232 may be provided along each side of the cartridge 200 towards the back end of the cartridge 200. The gripper slots 232 may be used to enable a robotic gripper mechanism to easily grasp the cartridge 200, such as during the loading and unloading of the cartridge 200 from a data drive, or when retrieving the cartridge 200 from a storage bay in a cartridge library. Alignment holes 234 may be provided to enable a data drive or other mechanism to precisely locate a known datum on the cartridge 200 or to facilitate the identification of the type of cartridge. An insertion slot 236 may also be provided on each side of the cartridge 200 towards the front end of the cartridge 200. A detent 238 may be provided inside the insertion slot 236. The insertion slot 236 and the detent 238 may be used to guide, position, and retain the cartridge 200 within a data drive during read/write operations to the data storage medium 210 or may be used by the library cartridge handling mechanisms.

Figure 3B:
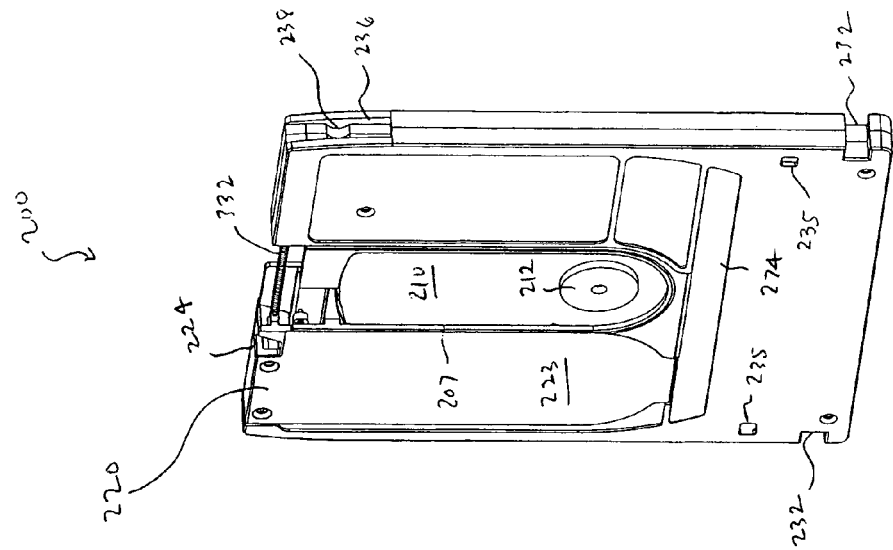
FIGS. 3A-3B show bottom perspective views of a data storage cartridge, in accordance with embodiments of the present invention.
Figure 3A:
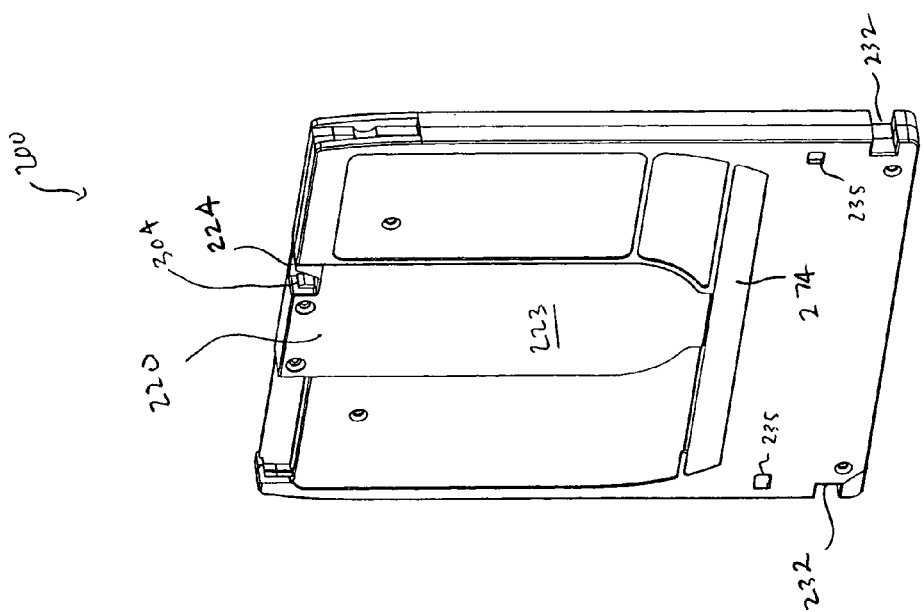

FIGS. 3A-3B show perspective views of the bottom side of the cartridge 200 with the shutter 220 in the closed position and in the open position, respectively. In these figures, it can be seen that the bottom shell 205 includes a bottom aperture 207 similar to the top aperture 206 and alignment holes 235 similar to alignment holes 234. In other embodiments, a media access aperture may be provided on only one side of the cartridge.

FIG. 4A shows the outer side of the top shell 204, with the various shutter components removed. FIG. 4B is a side view of the top shell 204, and FIG. 4C shows the interior side of the top shell 204. The interior side of the shell 204 is the side that is adjacent the data storage medium 210 when the cartridge 200 is assembled. The interior side includes a circular region 240 for receiving the disk-shaped storage medium 210 and four screw mounts 242 for receiving screws used to couple the top shell 204 with the bottom shell 205. An upper guide slot 246 is provided for receiving a lip of the shutter 220, which is retained in the guide slot 246 by guide slot cover 248 (shown in FIGS. 2A-2B).

The top shell 204 also includes an front region 250 that extends beyond the edge of the storage medium 210 closest to the side of the cartridge 200. An upper guide rail 244 is provided along the front region 250 for guiding the shutter assembly and for providing additional stiffness to the housing structure. An upper optics opening 252 is also provided on a portion of the front region 250 to provide clearance for a read/write assembly to be mated with the cartridge 200, as will be described in greater detail below. A portion 254 having a reduced thickness remains between the optics opening 252 and the top media access aperture 206.

FIG. 5A shows the outer side of the bottom shell 205, with the various shutter components removed. FIG. 5B is a side view of the bottom shell 205, and FIG. 5C shows the interior side of the bottom shell 205. The interior side of the bottom shell 205 includes a circular region 260 that matches circular region 240 on the top shell 204. A shutter cam opening 262 and a lower optics opening 264 are provided in the front region 250 of the bottom shell 205. A portion 266 having a reduced thickness remains between the lower optics opening 264 and the bottom media access aperture 207. Screw holes 268 are provided which align with screw mounts 242 on the top shell 204. The front region 250 of the bottom shell 205 also includes a lower guide rail 270 and a lock latch 280. A lower guide slot 272 is provided for receiving a lip of the shutter 220, which is retained in the guide slot 272 by guide slot cover 274 (shown in FIGS. 3A-3B).

In accordance with aspects of the present invention, a lock assembly 300 (shown, e.g., in FIGS. 8A-8B, 9A-9B, and 10A-10B) may be used to prevent accidental opening of the shutter 220. This may be particularly advantageous in applications where the storage medium 210 is sensitive to light. In such situations, it may be desirable to provide a lock so that the shutter 220 will not be inadvertently opened during handling or in the event that the cartridge 200 is loaded into the wrong type of data drive.

Figure 7B:
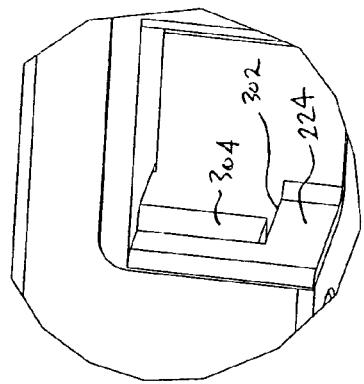
FIGS. 7A-7B show a shutter lock assembly in an unlocked position, in accordance with embodiments of the present invention.
Figure 7A:
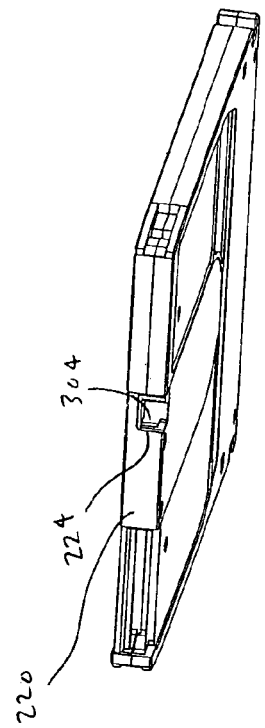
Figure 6B:
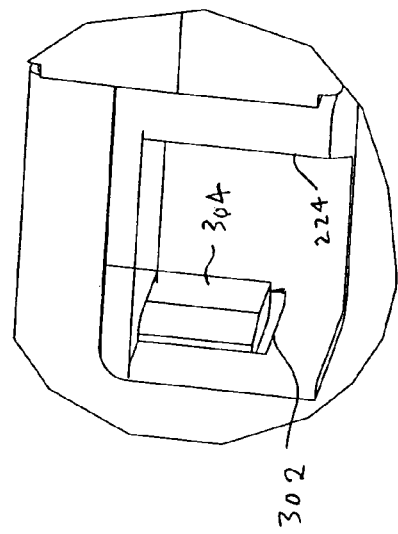
FIGS. 6A-6B show a shutter lock assembly in a locked position, in accordance with embodiments of the present invention.
Figure 6A:
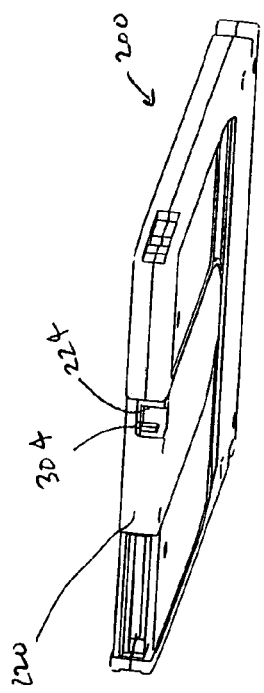

FIG. 6A shows the front side of the cartridge 200, and FIG. 6B is a magnified view of the shutter slot 224, showing a lock actuator 304 protruding from a lock actuator opening 302 in the locked position. With the lock actuator 304 in the locked position, the shutter 220 cannot be opened. FIGS. 7A-7B show the lock actuator 304 recessed into the lock actuator opening 302, which corresponds to the unlocked position. When the lock actuator 304 is in the unlocked position, the shutter 220 is free to be opened. Although the precise arrangement of the lock actuator 304 and the shutter 220 may vary, in the illustrated embodiment, the lock actuator 304 protrudes from the opening 302 by approximately 0.8 mm when in the locked position and is recessed by approximately 1.0 mm when in the unlocked position. Accordingly, the shutter opener 430 displaces the lock actuator 304 by approximately 1.8 mm before the shutter 220 can be opened.

Figure 8B:
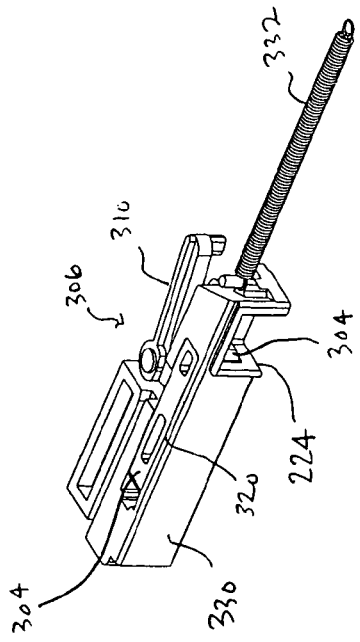
FIGS. 8A-8B are perspective views of a shutter cam and lock assembly, in accordance with embodiments of the present invention.
Figure 8A:
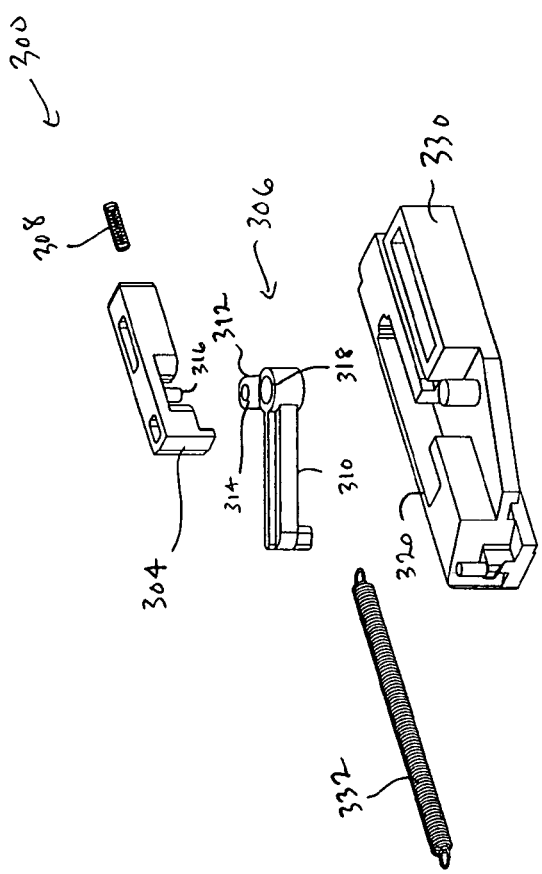

FIG. 8A is an exploded rear view of a shutter cam 330 including the lock assembly 300, in accordance with embodiments of the present invention. FIG. 8B is a front perspective view of the assembled shutter cam 330, shutter return spring 332, and lock assembly 300. The lock assembly 300 comprises the lock actuator 304, a locking arm 306, and an actuator return spring 308. The locking arm 306 comprises a first finger 310 and a second finger 312, and is configured to rotate about a pivot hole 318. The second finger 312 includes an aperture 314 that receives a pin 316 on the lock actuator 304. The lock actuator 304 is configured to slide back and forth between a first end and a second end of an actuator slot 320.

FIGS. 9A-9B are top views of the bottom shell 205 with the lock assembly 300 in the locked position. As can be seen in the enlarged view in FIG. 9B, when the lock assembly 300 is in the locked position, the lock actuator 304 is biased by the actuator return spring 308 so that it is disposed on the first end of the actuator slot 320 and protrudes slightly from the lock actuator opening 302. With the lock actuator 304 in this position, the locking arm 306 is rotated about pivot hole 318 such that the first finger 310 engages the lock latch 280 on the bottom shell 205. This prevents the shutter cam 330 from sliding, thereby locking the shutter 220 closed.

FIGS. 10A-10B are top views of the bottom shell 205 with the lock assembly 300 in the unlocked position. As can be seen in the enlarged view in FIG. 10B, the lock actuator 304 has been urged to the second end of the actuator slot 320 such that the lock actuator 304 is recessed into the lock actuator opening 302. The pin 316 on the lock actuator 304 draws the second finger 312 of the locking arm 306 along with the lock actuator 304, causing the locking arm 306 to rotate. This rotation releases the first finger 310 from the lock latch 280, thereby freeing the shutter cam 330 to slide and open shutter 220.

Figure 11:
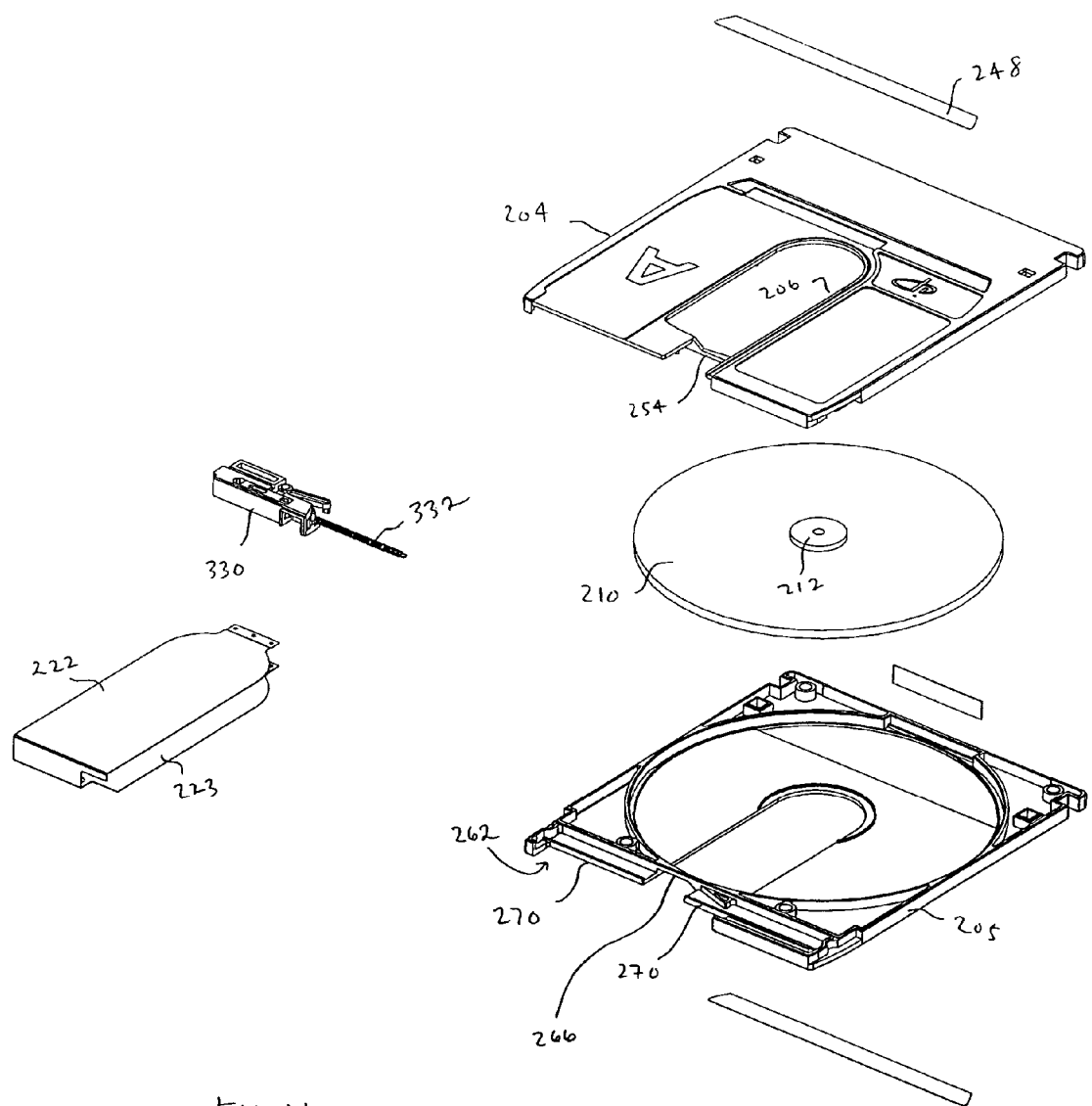
FIG. 11 is an exploded top perspective view of a cartridge, in accordance with embodiments of the present invention.
Figure 12:
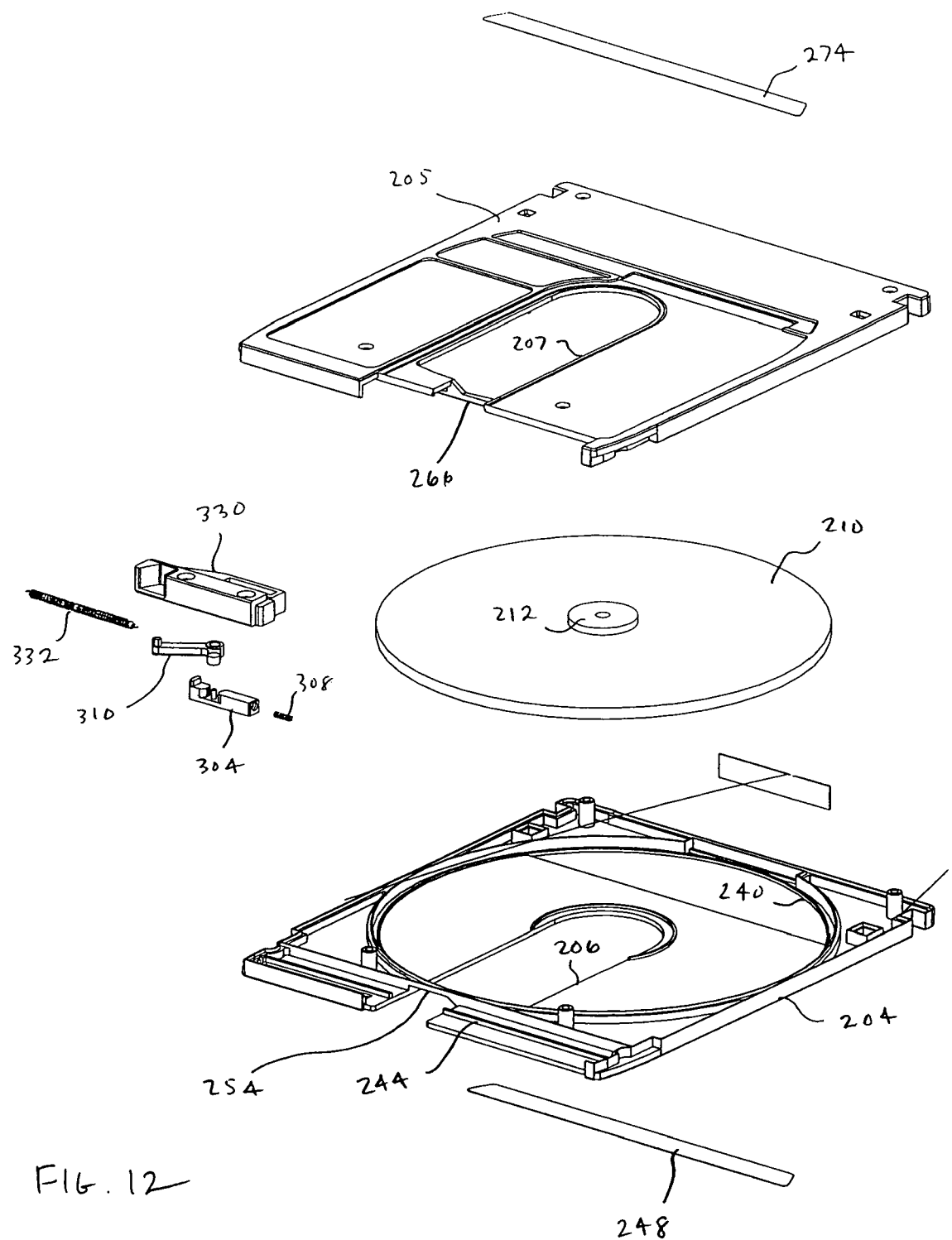
FIG. 12 is an exploded bottom perspective view of a cartridge, in accordance with embodiments of the present invention.

FIG. 11 is an exploded top perspective view and FIG. 12 is an exploded bottom perspective view of the cartridge 200. The shutter cam 330 together and the lock assembly 300 are retained between the top and bottom shells 204, 205. The shutter cam 330 is guided by lower guide rail 270 and upper guide rail 244. The lower guide rail 270 and upper guide rail 244 also provide additional structural support for the front region 250. Because the bottom shell 205 has the shutter cam opening 262, the shutter cam 330 is permitted to slide back and forth within the shutter cam opening 262. The shutter cam 330 is coupled to the cover portions 222, 223 of the shutter 220 such that as the shutter cam 330 slides across the shutter cam opening 262, the shutter 220 is moved into the open position, thereby exposing the storage medium 210.

Figure 13:
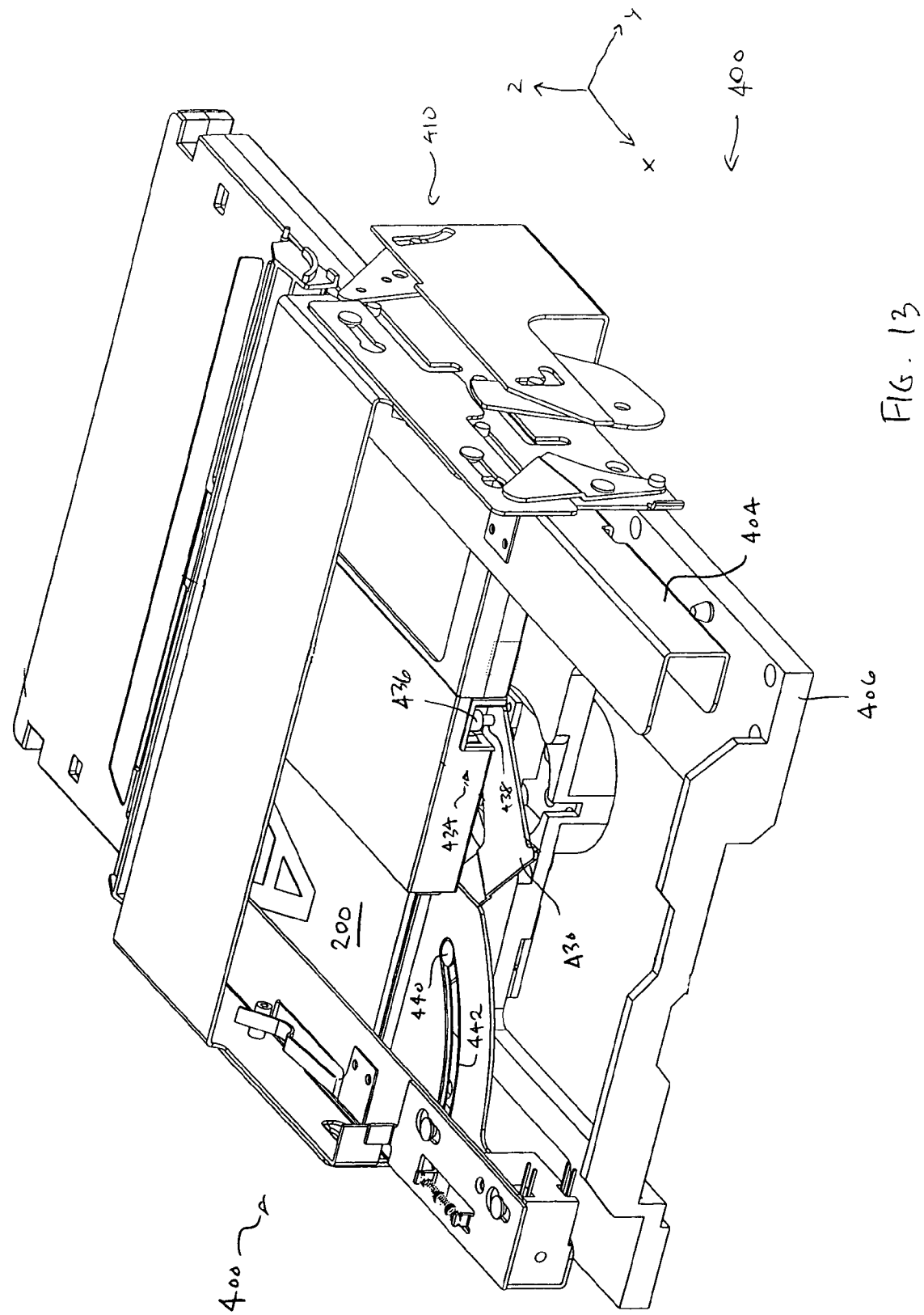
FIG. 13 is a rear perspective view of a data drive assembly with a data storage cartridge partially inserted therein, in accordance with embodiments of the present invention.

The cartridge 200 described above may be used in conjunction with a data drive configured to unlock and open the shutter 220 during the loading process. FIG. 13 is a perspective view of a data storage cartridge 200 partially inserted into a data drive assembly 400, in accordance with embodiments of the present invention. The data drive assembly 400 may comprise the loading mechanism for a data drive, which could be provided, for example, as part of a data storage library system. An exemplary data drive assembly 400 is described in the U.S. patent application entitled, "DATA STORAGE CARTRIDGE LOADING SYSTEM," by Gregory P. Hertrich, Ser. No. 10/632,659, filed Jul. 31, 2003. The description of the system and its operation in the above-cited application is incorporated by reference herein in its entirety as if fully set forth below. Other data drive designs may be used in other embodiments.

In the illustrated embodiment, a cartridge carrier 404 is configured to receive the data storage cartridge 200 when in an unload position, as shown in FIG. 13. A carrier loading assembly 410 drives the carrier 404 to move from the unload position to a load position such that the hub 212 provided in the data storage cartridge 200 is mated with a spindle provided on a sled 406. The cartridge carrier 404 may further include a shutter opener 430 having a lock release. The lock release comprises a boss 434 having a lock release portion 436 and a shutter opening portion 438. The shutter opener 430 is configured to rotate about a rotation pin and is guided in its rotation by guide pin 440, received in guide slot 442.

A data transfer mechanism may be mounted onto the drive base for reading data from and/or writing data to the storage medium 210 contained within the data storage cartridge 200. As used herein, the term "data transfer mechanism" is defined as a mechanism which can either: (1) read data from a data storage medium; (2) write data to a data storage medium; or (3) read data from and write data to a data storage medium. Various methods can be used for storing and reading the data, including, e.g., optical, magneto-optical, magnetic, and electronic. In some embodiments, a holographic read/write assembly may be used as the data transfer mechanism.

In the illustrated data drive assembly 400, the loading of the cartridge 200 into the carrier 404 is performed manually by the user or by a mechanical robotic insertion device, without assistance from the data drive assembly 400. The boss 434 on the shutter opener 430 may be used to both unlock the shutter 220 and to slide the shutter 220 to the side, thereby exposing the storage medium 210. The shutter return spring 332 (shown, for example, in FIGS. 8A-8B) provides a bias to retain the shutter 220 in the closed position. As shown in FIG. 13, when the cartridge 200 is inserted into the carrier 404 a first distance in the x-direction, the boss 1434 enters the shutter slot 224 in the shutter cam 330. As described above, the shutter lock assembly 300 prevents the shutter 220 from opening unless the lock actuator 304 is depressed.

As the cartridge 200 is inserted deeper into the carrier 404 in the x-direction, the top portion (i.e., the lock release portion 436) of the boss 434, which has a larger diameter than the bottom portion (i.e., the shutter opening portion 438), applies a pressure onto the lock actuator 304. As the cartridge 200 continues moving deeper into the carrier 404, the shutter slot 224 applies a force in the x-direction onto the boss 434, causing the boss 434 to travel with the cartridge 200 in the x-direction. Because the shutter opener 430 is rotatably mounted to the carrier 404, the rotational path of travel of the boss 434 causes the boss 434 to simultaneously travel in the negative y-direction (as indicated by the axes illustrated in FIG. 13) as it is pushed in the x-direction by the cartridge 200. This movement enables the boss 434 to travel together with the cartridge 200 in the x-direction, while applying a force against the shutter slot 224 in the negative y-direction.

Because the lock release portion 436 and the shutter opening portion 438 are differently sized, they contact the shutter cam 330 at different points. In the illustrated embodiment, the lock release portion 436 has a radius that is 1.0 mm larger than the radius of the shutter opening portion 438. Thus, the upper portion (i.e., the lock release portion 436) of the boss 434 causes the lock actuator 304 to be depressed into the cartridge 200, thereby unlocking the shutter lock assembly 300, as described above. After the shutter lock is released, the lower, smaller diameter portion of the boss 434 (i.e., the shutter opening portion 438) contacts the edge of the shutter slot 224 and pushes the shutter 220 in the negative y-direction, thereby opening the shutter 220. In other embodiments, the upper portion of the boss 434 serves to both unlock the lock actuator 304 and slide the shutter 220 open. The lower portion of the boss 434 need not contact the shutter slot 224.

Figure 14:
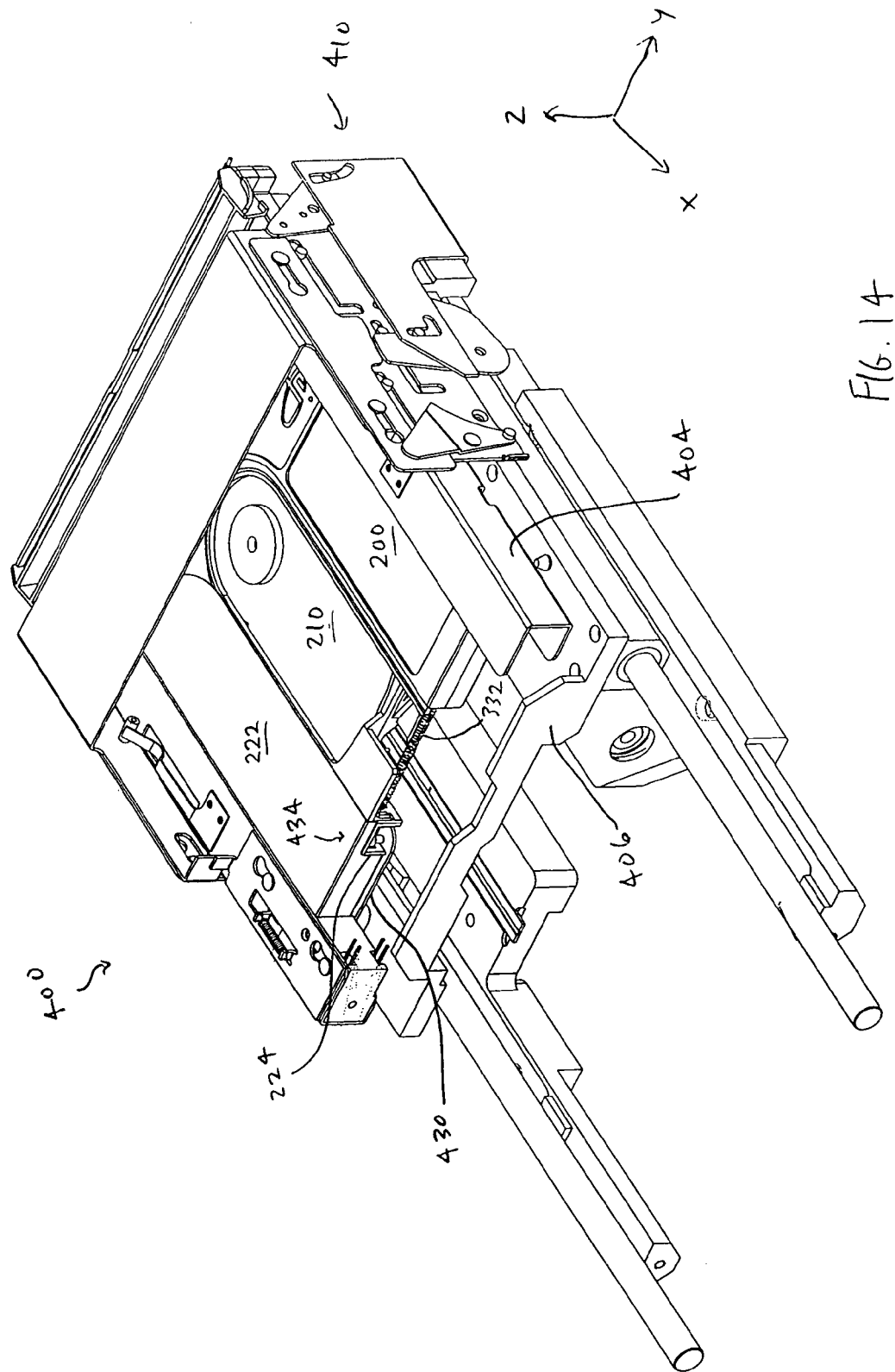
FIG. 14 is a rear perspective view of a data drive assembly with a data storage cartridge fully inserted therein and with an open shutter, in accordance with embodiments of the present invention.

When the cartridge 200 has been fully inserted into the carrier 404, the boss 434 will have drawn the shutter 220 into the fully open position, as shown in FIG. 14. Here, it can be seen that when the shutter 220 is fully open, the top media access aperture 206 in the cartridge housing 202 is exposed. Similarly, the bottom media access aperture 207 is also exposed. A portion of the top and bottom surfaces of the storage medium 210 are exposed by the media apertures 206, 207. As the hub 212 at the center of the storage medium 210 is rotated by the drive spindle, successive portions of the storage medium 210 are exposed by the media apertures 206, 207. This enables the data transfer mechanism to access the complete surface of the storage medium 210.

The unloading of the cartridge 200 is performed in a similar fashion. As the cartridge 200 is withdrawn from the carrier 404, two springs may be used to assist in returning the shutter 220 to the closed position. First, the shutter return spring 332 applies a force onto the shutter cam 330, drawing the shutter 220 closed. In addition, a shutter opener spring (not shown) applies a force onto the shutter opener 430, drawing the shutter opener 430 back to the unload position, as shown in FIG. 13. During withdrawal of the cartridge 200, the boss 434 travels with the cartridge 200 in the negative x-direction. Due to the boss's circular path, the boss 434 also moves in the positive y-direction, thereby allowing the shutter 220 to close. Towards the end of the path of boss 434, as the lock release portion 436 disengages from the lock actuator 304, the compressed actuator return spring 308 returns the lock actuator 304 to the locked position, thereby locking the shutter 220 until the next load.

Data storage cartridges in accordance with embodiments of the present invention may achieve numerous advantages over conventional cartridge designs. For example, the cartridge 200 may have exterior dimensions similar or identical to the dimensions of a standard, conventional magneto-optical disk cartridge, yet be used with a holographic storage medium. Adherence to a conventional form factor for the cartridge housing facilitates the adoption of existing components and handling assemblies currently used for magneto-optical storage with holographic storage applications. However, as mentioned above, if a holographic storage cartridge is loaded into an MO drive, the read/write mechanism of the MO drive could severely damage the holographic media and/or the data stored thereon. Similarly, if an MO cartridge were loaded into the holographic storage drive, the MO storage medium and/or the MO cartridge housing could be damaged by the holographic data transfer assembly.

By locating the shutter slot 224 in a different location than the detent 110 according to the MO standard, the accidental misleading of one type of cartridge into the wrong type of data drive may be avoided. The shutter opening mechanisms of each type of drive would not be configured to engage the shutter in the expected location of the shutter slot/detent. In addition, the use of a shutter lock can provide further protection against the shutter opening mechanism of a different drive type accidentally opening the locked shutter.

The positioning of the above-described lock actuator 304 within the shutter slot 224 and the direction of applied force necessary to release the lock may further inhibit inadvertent opening of the shutter 220. In addition, this design can enable the cartridge to be used with a single, simple shutter opening mechanism to both unlock and translate the shutter 220. The accidental unlocking and opening of the shutter 220 can further be inhibited in embodiments that require that the lock actuator 304 be depressed sufficiently far that the surface of the lock actuator 304 is recessed within the lock actuator opening 302.

In accordance with aspects of the present invention, a data storage cartridge 200 is provided having a housing with one or more regions of reduced thickness. This may be desirable when the cartridge 200 is utilized with a data drive having a data transfer assembly with components that would be obstructed if the walls of the housing were of uniform thickness.

Figure 15:
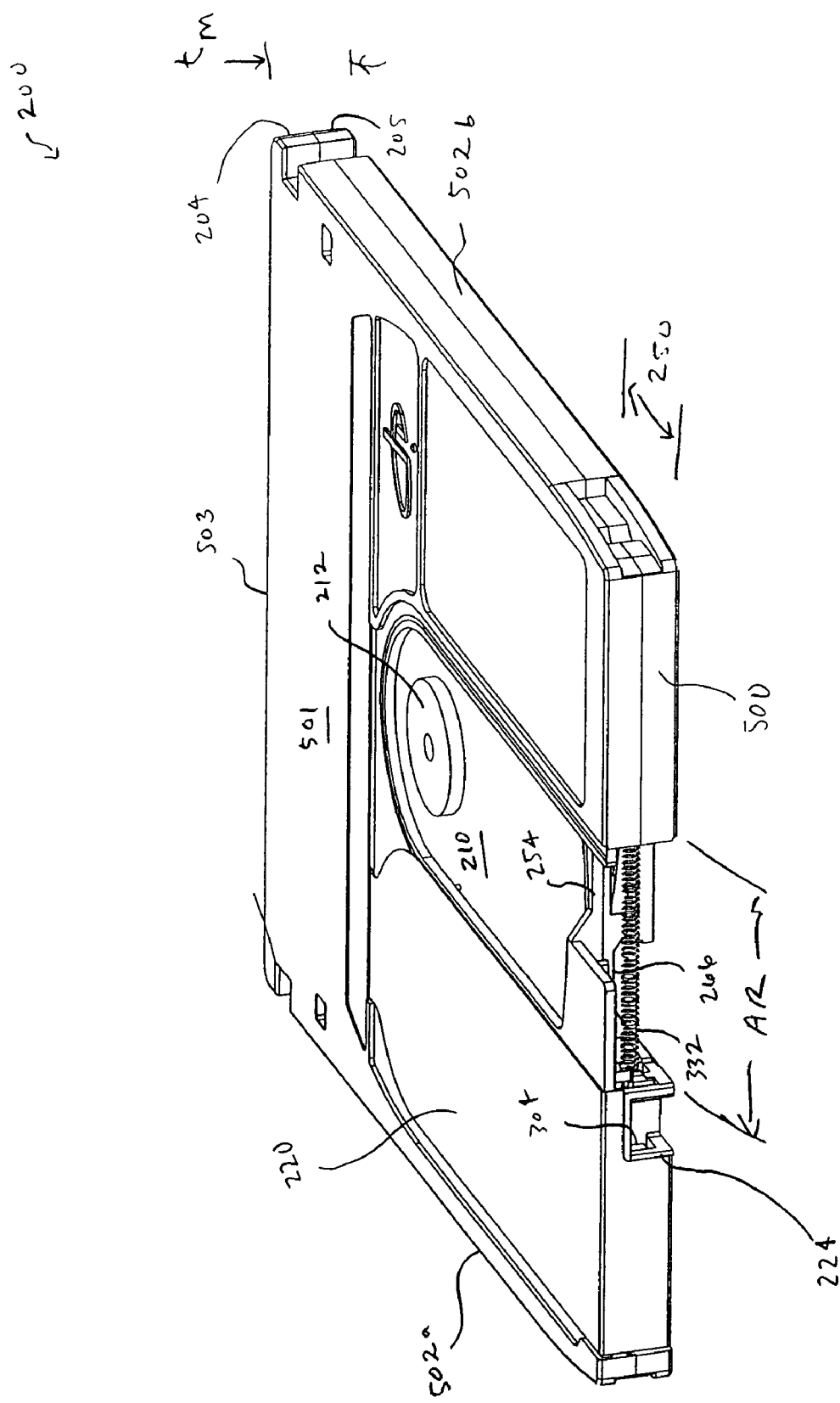
FIG. 15 is a perspective view of an access side of a cartridge, in accordance with embodiments of the present invention.

FIG. 15 is a perspective view of the cartridge 200, having a top side 501, a bottom side (not shown in FIG. 15), a front side 500, a back side 503, and two lateral sides 502a-502b. The top side 501 defines a top plane of the cartridge 200 and the bottom side defines a bottom plane of the cartridge 200. In FIG. 15, the front side 500 is also the access side of the cartridge 200. The access side is the side of the cartridge 200 from which the data transfer assembly approaches when the data transfer assembly is mated with the storage medium 210 in the cartridge 200. In the embodiment shown, the access side is also the side that includes the front region 250, defined as the region between the front side 500 of the cartridge 200 and the edge of the storage medium 210 closest to the front side 500.

Figure 16A:
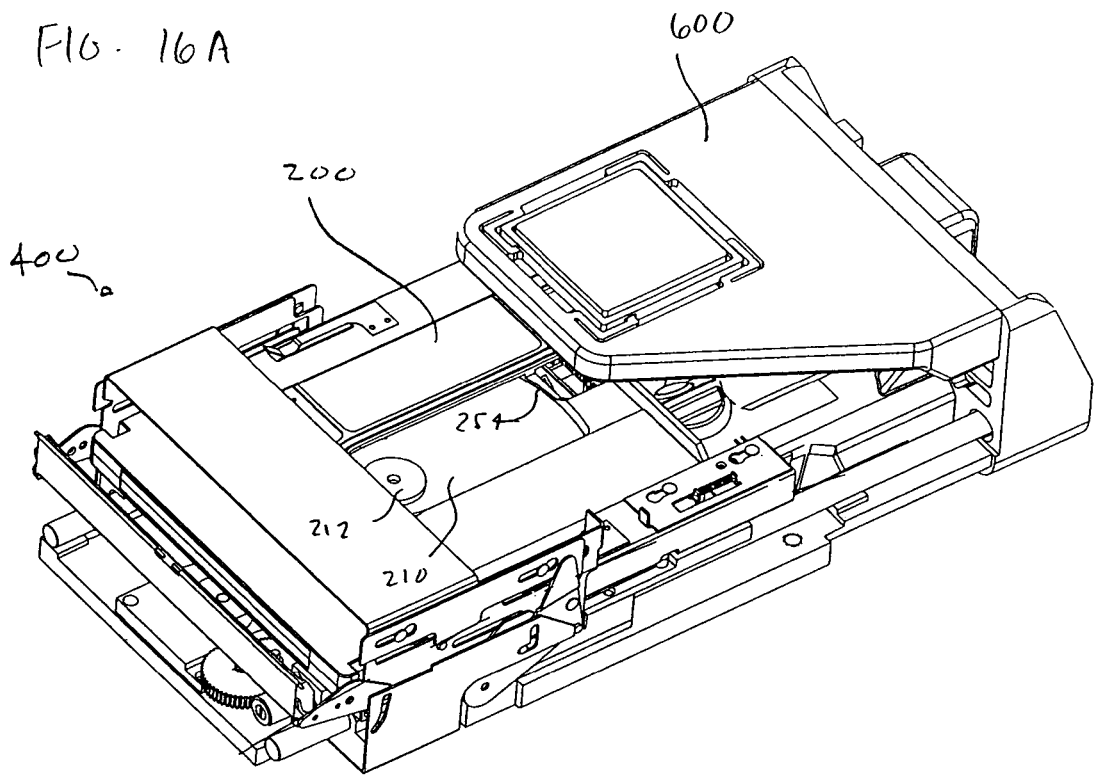
FIGS. 16A-16B are perspective views of a data drive assembly and data transfer assembly, in accordance with embodiments of the present invention.
Figure 16B:
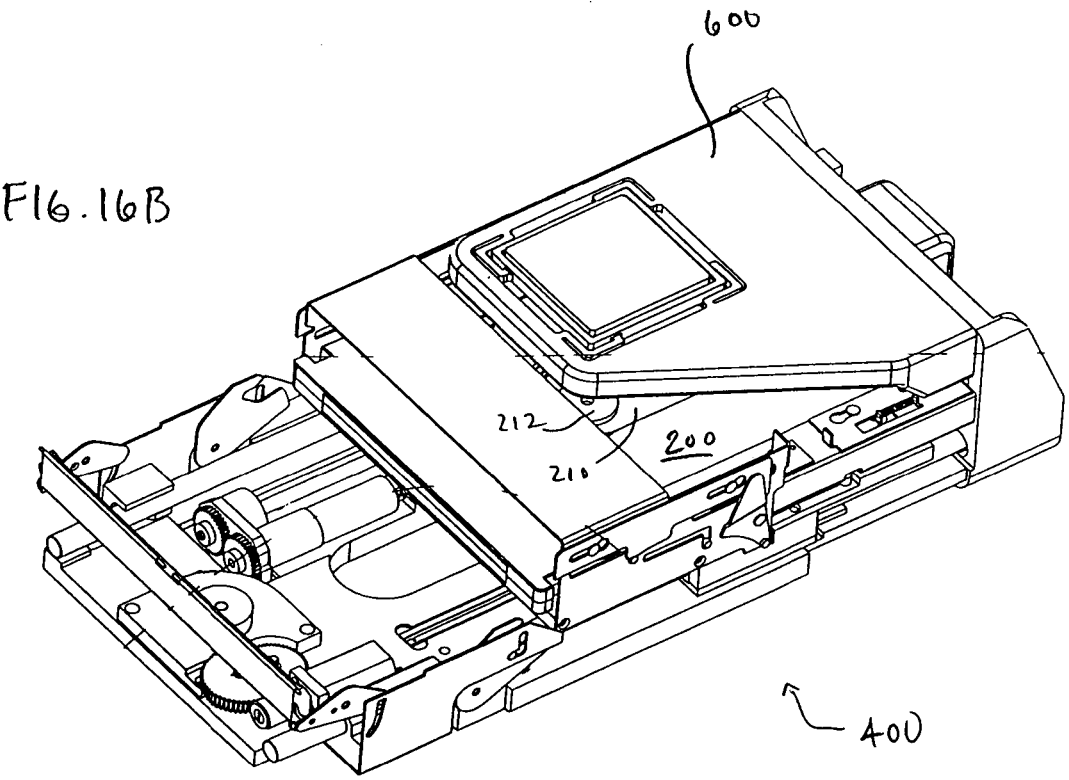

FIGS. 16A-16B are perspective views of the cartridge 200 loaded into the data drive assembly 400. In FIG. 16A, the cartridge 200 is approaching the data transfer assembly 600 and in FIG. 16B, the data transfer assembly 600 is mated with the cartridge 200 and is in position to read and write data to and from the data storage medium 210. In the illustrated embodiment, the cartridge 200 is a holographic data storage cartridge and the data transfer assembly 600 is a holographic read/write assembly. In other embodiments, different data storage technologies can be used. In addition, the data transfer assembly 600 may enable reading of data only or may enable the reading and writing of data.

Figure 17A:
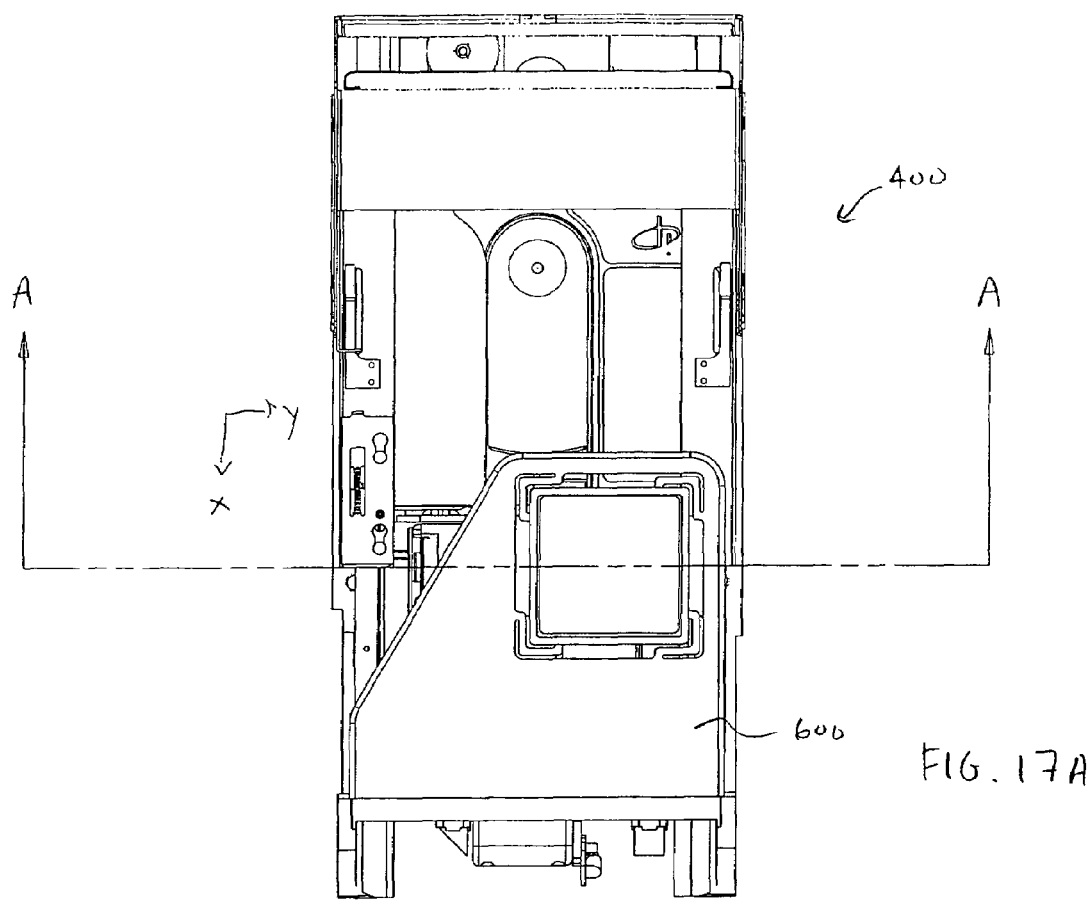
FIG. 17A is a top view of a data drive assembly and data transfer assembly, in accordance with embodiments of the present invention.
Figure 17B:
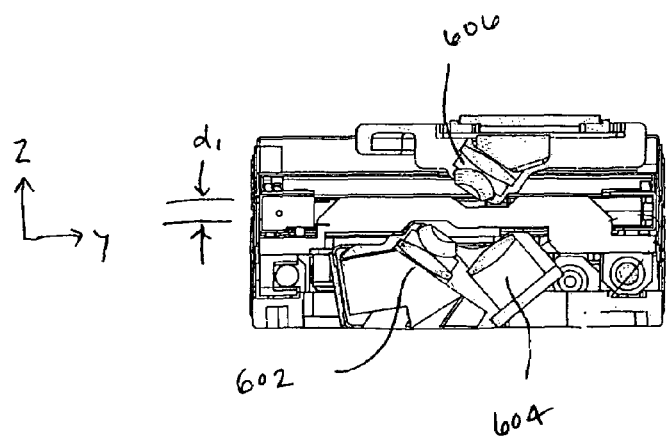
FIG. 17B is a cross-sectional view of the data drive assembly and data transfer assembly in FIG. 17A.

FIG. 17A is a top view of the data drive assembly 400 and FIG. 17B is a cross-sectional view taken along the line A-A in FIG. 17A. FIG. 17B shows some of the components of the holographic data transfer assembly 600, in accordance with embodiments of the present invention. These components include an encoder 602 for producing encoded signal beams, a detector 606 for detecting the interference pattern from the storage medium 210, and a reference beam generator 604 for producing a reference beam.

As can be seen in FIG. 17A, the encoder 602, the detector 606, and the reference beam generator 604 are positioned relatively close to each other. In particular, the distance, $d_1$, between the encoder 602 and the detector 606 may be smaller than the maximum thickness, $t_M$, of the cartridge 200 (as shown in FIG. 15). Therefore, as the data transfer assembly 600 is brought towards the access side of the cartridge 200 to position the storage medium 210 between the encoder 602 and the detector 606, the cartridge housing 202 may obstruct these components and prevent the cartridge 200 from entering the data transfer assembly 600. To prevent such an obstruction, the housing 202 may include one or more portions of reduced thickness on the access side of the catridge 200 to provide clearance for the data transfer assembly components.

Figure 18A:
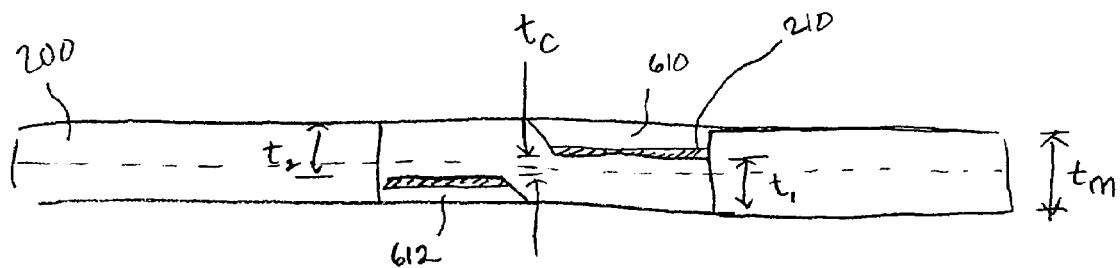
FIGS. 18A-18B are simplified cross-sectional views of cartridges having regions of reduced thickness, in accordance with embodiments of the present invention.
Figure 18B:
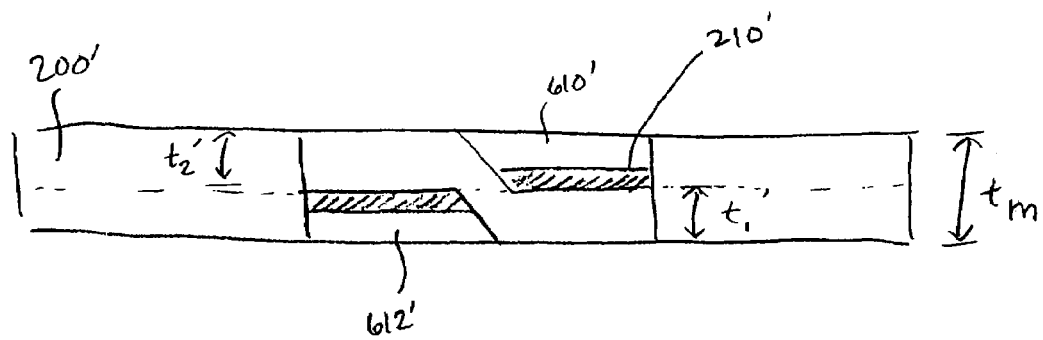

FIGS. 18A-18B are simplified cross-sectional views of the cartridge 200 and a cartridge 200'. In FIG. 18A, there are two regions 610, 612 of reduced thickness in the front region 250. The maximum thickness, $t_M$, of the cartridge 200 is defined as the distance between the plane forming the top of the cartridge 200 and the plane forming the bottom of the cartridge 200. The thickness of the first region 610 is $t_1$, and the thickness of the second region is $t_2$, wherein $t_1$ and $t_2$ are both less than $t_M$. With this arrangement, the minimum clearance between the data transfer components is $t_M$, which is the distance between the two surfaces forming the regions 610, 612.

In FIG. 18B, the sum of the thicknesses, $t_1+t_2'$, is equal to the maximum thickness, $t_M$. Therefore, the minimum clearance between the data transfer components is $t_c=0$. In other words, the minimum necessary clearance for the data transfer assembly 600 is determined by the thickness of the storage medium 210, not the cartridge housing 202.

Figure 19C:
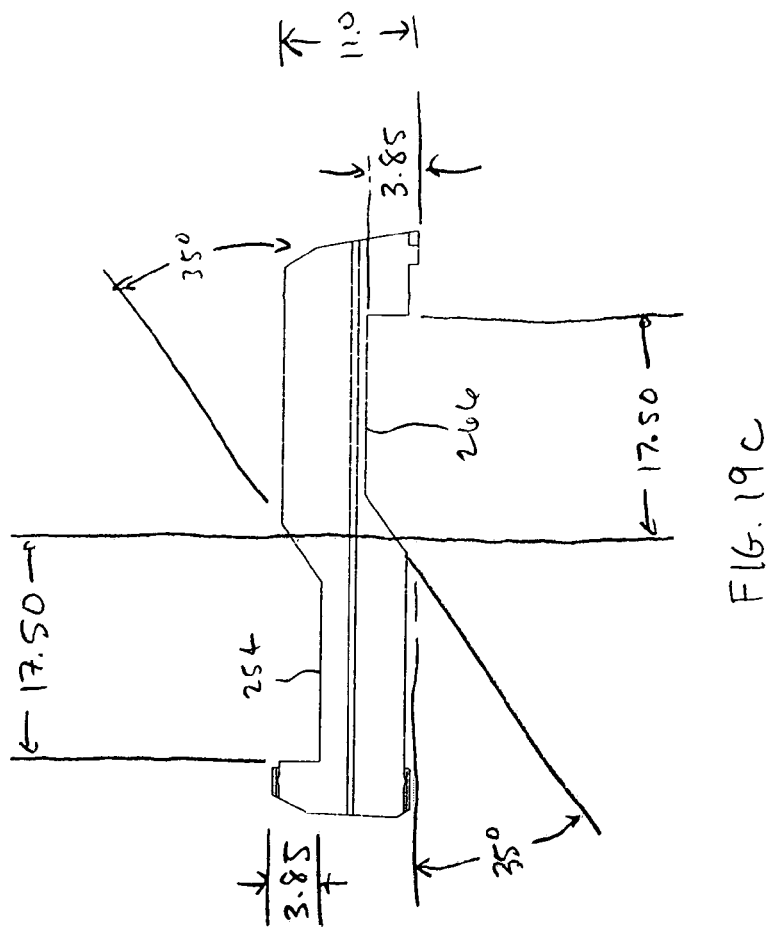
FIGS. 19A-19C are top, front, and cross-sectional views of a cartridge in accordance with embodiments of the present invention.
Figure 19A:
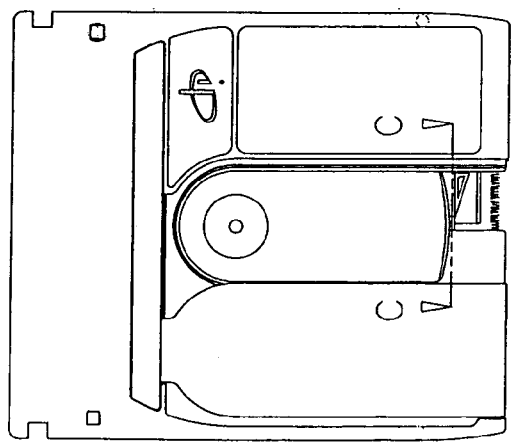
Figure 19B:

FIGS. 19A-19C are top, front, and cross-sectional views of an embodiment of the invention. FIG. 19C is a partial cross-sectional view taken along line C-C in FIG. 19A, with dimensions in millimeters provided in a 4:1 scale. In this embodiment, the regions of reduced thickness 254 and 266 are offset to accommodate the offset components of the data transfer assembly 600, as shown in FIG. 17B. In other embodiments, the components of the data transfer assembly 600 may be aligned in the z-direction, so that the regions of reduced thickness 254 and 266 may be aligned as well.

Figure 1A:
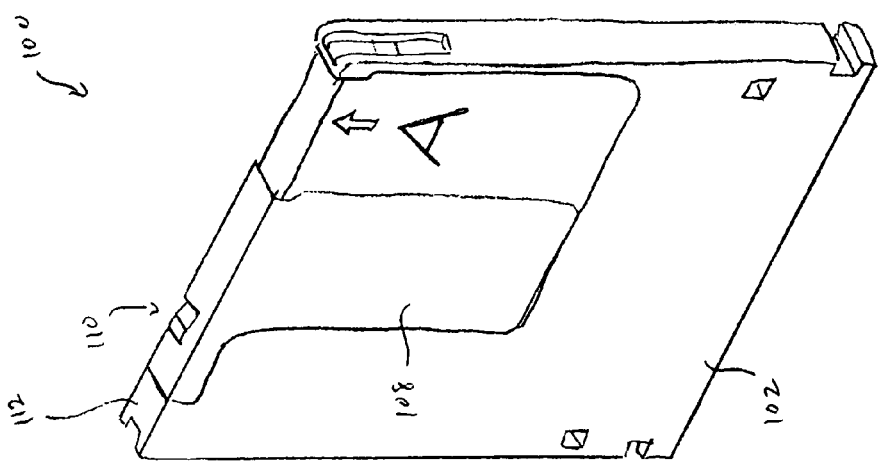
FIGS. 1A-1B show top and bottom perspective views of a prior art data storage cartridge.
Figure 1B:
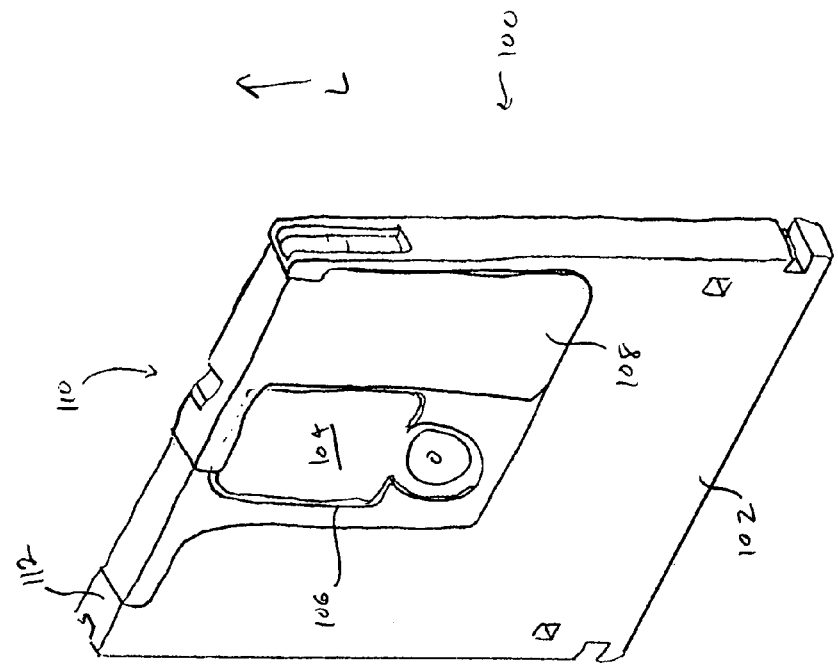

In accordance with other aspects of the present invention, the above-described shutter 220 and shutter cam 330 arrangement may enable the shutter 220 and shutter cam 330 to be completely clear of the access region (AR), as shown in FIGS. 2B and 15. The access region is the width of the aperture 206 along the front region 250 of the cartridge 200. The positioning of the shutter 220 and shutter cam 330 to the side of the access region enables a data transfer assembly to access the data storage medium 210 without being blocked by the shutter 220 and shutter cam 330. In contrast, in the cartridge 100 shown in FIG. 1B, it can be seen that the cartridge opening detent 110 is positioned within the access region. Such an arrangement would decrease the width of the region which may be provided with a reduced thickness, as described above.

Embodiments of the present invention having regions of reduced thickness described above may provide a data storage cartridge that can be used in conjunction with a data transfer assembly having a small amount of clearance between components, while also providing a structurally sound housing that prevents the data storage medium 210 from being exposed to ambient light or other contaminants during handling. In some embodiments, the region(s) of reduced thickness may have no thickness whatsoever. In other words, the cartridge housing 202 may not extend completely across the access region. However, it may be desirable to maintain some portion of housing across the entire front region of the cartridge to improve rigidity and strength of the cartridge.

Data drive systems incorporating the above-described data drive assembly may achieve numerous advantages over existing systems. For example, the regions of reduced thickness may provide an unobstructed path parallel to the major surface of the cartridge 200 (i.e., the top side 501) that extends below the plane defined by the top side 501 of the cartridge. In other words, the cartridge 200 provides a region having a reduced thickness that extends from the access side of the cartridge 200 to the storage media 210.

The foregoing description of the preferred embodiments of the invention has been presented for the purposes of illustration and description. It is not intended to be exhaustive or to limit the invention to the precise form disclosed. Many modifications and variations are possible in light of the above teaching. For example, although the embodiments described above refer to holographic storage systems, in other embodiments the data storage cartridge may use a different data storage method, such as, for example, optical storage, magneto-optical storage, magnetic storage, or electronic storage. In the above-described embodiments, the data storage medium comprises a rotatable disk. In other embodiments, the data storage medium may take other forms. For example, the medium may have different shapes or be immobilized within the cartridge. In addition, the configurations of the various data drive components described and illustrated herein may vary in other embodiments. For example, the arrangement of the encoder 602, the reference beam generator 604, and the detector 606 may vary. In some embodiments, the data transfer assembly 600 may be provided on only a single side of the cartridge 200.

It is intended that the scope of the invention be limited not by this detailed description, but rather by the claims appended hereto. The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A data storage cartridge comprising:
    a housing having a top, a bottom, a front side, a back side, a first lateral side, and a second lateral side, said housing having a first media access aperture on the top of the housing; and
    a data storage medium contained within the housing, the data storage medium comprising a disk with a top and a bottom;
    wherein the front side of the housing contains a first segment of reduced thickness less than a thickness of the front side of the housing, and
    wherein the first segment of reduced thickness is adjacent to the first media access aperture and has a length along the front side of the housing, perpendicular to the thickness of the front side of the housing, which is less than or equal to a width of the first media access aperture parallel to the front side of the housing;
    a second media access aperture provided on the bottom of the housing;
    wherein the front side of the housing contains a second segment of reduced thickness less than a thickness of the front side of the housing, the second segment adjacent the second media access aperture and offset laterally from the first segment.

2. The data storage cartridge of claim 1, wherein:
    the first segment of reduced thickness defines an opening extending from a plane defined by the top of the housing to a plane defined by the top of the data storage medium.

3. The data storage cartridge of claim 1, wherein:
    said housing further comprises a shutter assembly movable from a closed position to an open position such that the shutter assembly blocks at least part of the first segment of reduced thickness when in the closed position and exposes at least part of the first segment of reduced thickness when in the open position.

4. The data storage cartridge of claim 1, wherein:
    the data storage medium comprises a holographic storage medium.

5. The data storage cartridge of claim 1, wherein
    the top of the housing defines a top plane; and
    wherein said housing includes an unobstructed access path to the data storage medium from the front side, said unobstructed access path passing through the top plane.

6. The data storage cartridge of claim 5, wherein:
    said housing further comprises a shutter assembly movable from a closed position to an open position such that the shutter assembly blocks the access path when in the closed position and exposes the access path when in the open position.

7. The data storage cartridge of claim 5, wherein:
    said data storage medium comprises a holographic data storage medium.

8. The data storage cartridge of claim 5, wherein the front side comprises a reduced thickness region defining a portion of the unobstructed access path to the data storage medium from the front side.

9. The data storage cartridge of claim 5, wherein a length of the unobstructed access path from the front side is less than or equal to a width of a media access aperture formed in the top side of the housing.

* * * * *